United States Patent [19]

Kato et al.

[11] Patent Number: 4,875,665
[45] Date of Patent: Oct. 24, 1989

[54] ACCUMULATOR

[75] Inventors: Eiji Kato, Kariya; Masanori Kadotani; Yoshikazu Sakaguchi, both of Anjo; Seitoku Kubo; Kunihiro Iwatsuki, both of Toyota; Hiroji Taniguchi, Toyota; Yoshihara Harada, Toyota, all of Japan

[73] Assignees: Aisin AW Co. Ltd., Anjo; Toyota Jidosha Kabushiki Kaisha, Toyota, both of Japan

[21] Appl. No.: 196,417

[22] Filed: May 20, 1988

[30] Foreign Application Priority Data

Jul. 28, 1987 [JP] Japan .................................. 62-188521

[51] Int. Cl.$^4$ ........................ F15B 1/053; F16L 55/04
[52] U.S. Cl. ..................................... 267/170; 60/413; 92/135; 138/31; 267/179
[58] Field of Search ..................... 267/64.11, 166–180, 267/91, 289, 64.27, 150, 124, 286, 289, 34, 290; 29/512; 92/135, 134, 130 R, 133, 130 D, 130 A, 132, 142; 60/413–418, 469; 138/30–31, 26; 403/274, 277, 282; 220/3, 855; 303/87, 71; 188/72.3, 170, 216; 137/264

[56] References Cited

U.S. PATENT DOCUMENTS

| 3,985,063 | 10/1976 | Lemon | 138/31 X |
| 4,014,213 | 3/1977 | Parquef | 138/31 X |
| 4,138,846 | 2/1979 | Sakakibara | 138/31 X |
| 4,166,655 | 9/1979 | Spero | 138/31 X |
| 4,428,258 | 1/1984 | Kubo et al. | 74/867 |
| 4,648,423 | 3/1987 | Henken | 267/180 X |
| 4,651,782 | 3/1987 | Fulmer | 138/31 |
| 4,685,491 | 8/1987 | Fulmer et al. | 138/31 |
| 4,769,990 | 9/1988 | Bach et al. | 138/31 X |
| 4,777,983 | 10/1988 | Steveley | 138/31 X |

FOREIGN PATENT DOCUMENTS

| 2913423 | 10/1980 | Fed. Rep. of Germany | 138/31 |
| 0170957 | 10/1983 | Japan | 138/31 |
| 61-48602 | 3/1986 | Japan . | |
| 0112839 | 5/1986 | Japan | 267/140.2 |

Primary Examiner—Douglas C. Butler
Attorney, Agent, or Firm—Kanesaka and Takeuchi

[57] ABSTRACT

In an accumulator including a piston which slides freely in a cylinder and a spring which presses the piston, a hole of the piston end where, at the bottom, a large diameter section is made, and small diameter section whose diameter is smaller than that of the large diameter section is located at another side of the large diameter section is located at another side of the large diameter section against the bottom of the hole is provided, and the spring assembly having the retaining member and the coil spring whose one end is fixed to the retaining member and another end is free is provided, and the snap ring is provided to hold the retaining member between the bottom of the hole and the snap ring which is installed in the large diameter section with radial expansion force, so that the spring assembly is installed in the hole of the piston.

7 Claims, 2 Drawing Sheets 4,875,665

ACCUMULATOR

BACKGROUND OF THE INVENTION

1. Field of the Invention

The present invention relates to an accumulator of an automatic transmission mounted on an automobile, particularly to a structure to hold a piston and a coil spring of the accumulator.

2. Description of the Prior Art

Generally an automatic transmission has a planetary gear mechanism, and certain elements in the mechanism are engaged or restrained by clutches or brakes (frictional engaging element) so that desired speed is obtained. These brakes and clutches are controlled by a hydraulic servo wherein oil pressure is applied or drained by switching of a shift valve. The hydraulic servo has an accumulator beside it, and according to hydraulic characteristic of the accumulator, characteristics of the hydraulic servo or those of the clutch and brake are determined.

Certain accumulator, such as for second brake functioning at second speed, for an over drive brake functioning at over-drive condition, for an over-drive direct clutch functioning changing from first to third speed, or for a direct clutch functioning at reverse condition and third speed, is preferable to obtain certain characteristic of accumulator by installing a coned disc spring or a coil spring which natural length is shorter than that of the piston stroke in an accumulator chamber so that such coil spring functions only at a start of the piston stroke. In this case, if a coned disc spring is used, it is difficult to set desired hydraulic characteristic because a coned disc spring has smaller degree of freedom on load capacity and coefficient of elasticity. On the other hand, if a coil spring is used and fixed on the housing, it tends to lean. And if the piston contacts the coil spring while the coil spring leans, the piston can not come to the bottom end of stroke, so that large shift shock may develop.

Then the applicant of the present invention proposed an accumulator which fixes its coil spring to the piston by caulking, bolting or clamping margin of the coil spring to prevent leaning of the coil spring as shown in the Japanese patent publication No. 61-48602.

Recently an automatic transmission has been mounted on small horse-powered cars, and an accumulator has been required to be small because of the tendency of so-called front-engine and front-drive cars.

In the above case, fixing the coil spring by caulking or bolting is quite difficult because the inner diameter of the coil spring becomes small, and keeping the coil spring vertical is also quite difficult. On the other hand, pressing by the clamping margin is easy to come off. If the clamping margin is made larger to prevent such coming off it is possible to press the coil spring.

The above clamping, bolting and pressing need larger area for fixing, so a large hole is necessary for the fixing area not to interfere with the housing. Accordingly in the case of an accumulator whose piston is installed upward, a concave area tends to catch air. The air occupies comparatively large area in the hole, so the characteristic of the accumulator may vary from the desired value, and may cause shift shock.

SUMMARY OF THE INVENTION

The objective of the present invention is to provide an accumulator which can hold a coil spring to the piston easily and firmly, and can keep the coil spring vertical and correct to solve the above mentioned problems.

Along the objectives of the above, the explanation is provided.

A hole is made in a piston end where, at the bottom, a large diameter section is made, and a small diameter section whose diameter is smaller than that of the large diameter section is made. A spring assembly whose one end is fixed to a retaining member and another end is free is provided. A retaining member is held between the bottom of the hole and a snap ring which is installed with radial pressing force against the large diameter section, so that the spacing assembly is installed on the hole.

In particular, it is preferable for the present invention to apply a coil spring which is located in an accumulator chamber, and has a natural length shorter than a piston stroke to function at the start of piston stroke against coil springs installed in another end of the piston.

In accordance with the above structure, when oil is applied to the accumulator chamber through an oil path to apply oil to certain engaging elements by switching of a shift valve, pressurized oil is supplied through the oil path. Based on total accumulator characteristics determined by the coil springs at the back pressure side, oil pressure applied to a back pressure room and the volume of the accumulator chamber, engaging characteristics of certain engaging elements are adjusted, so such engaging elements are smoothly engaged. Similarly when elements are released, oil in the accumulator chamber is drained from the oil path, the coil spring contacts a separator plate so that certain engaging elements are released based on accumulator characteristics.

When assembly, the burring hole is caulked, or by other means, under the condition that the coil spring is pressed. By this the spring assembly wherein the coil spring is kept vertical is laid in the hole in the piston, and the snap ring is installed with radial pressing force in the large diameter section so that the snap ring and the bottom of the hole hold the retaining member. As the snap ring has radial pressing force, it pressed the retaining member to closely contact the bottom of the hole, so the verticalness of the coil spring is correctly kept and the spring assembly is surly held.

Furthermore, even if air is caught in the accumulator chamber, the volume of the hole where air is caught is comparatively small, so that it does not affect the characteristics of the accumulator.

DETAILED DESCRIPTION OF THE PREFERRED EMBODIMENTS

Figure 1:
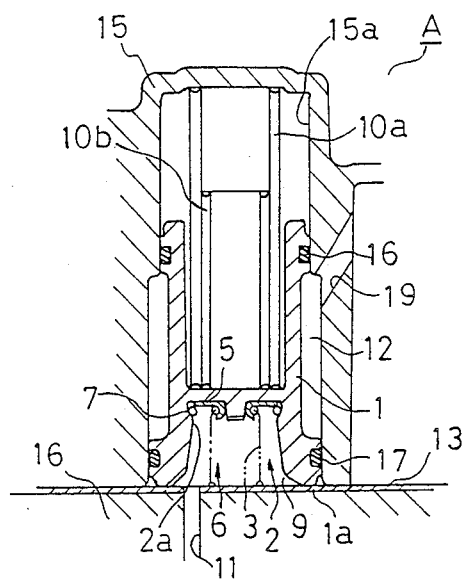
FIG. 1 is a cross sectional view of the accumulator of the present invention.

An accumulator 'A' for over-drive brake, as shown in FIG. 1, has a housing 15 which makes up a cylinder chamber 15a. The housing 15 is installed on a valve body 16 through a separator plate 13 by certain means. In the cylinder chamber 15a a piston 1 having "O-rings" 16, 17 slides freely to be oil proof. The end of the piston 1a and the separator plate 13 make an accumulator chamber 9, and the piston 1 (between O-ring 16 and 17) and the housing 15 make up a back pressure chamber 12. An oil path 11 comes to the accumulator chamber 9, and the oil path 11 goes to a shift valve and a hydraulic servo of an engaging element (over-drive brake). An oil path 19 comes to the back pressure chamber 12. Springs having two different natural length 10a, 10b are installed between another end of the piston 1 and the bottom of the housing 15, and the coil springs 10a, 10b press the piston 1 toward the accumulator chamber 9.

Figure 3:
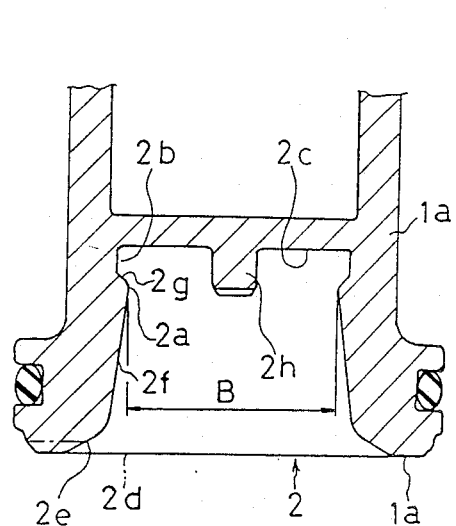
FIG. 3 is a cross sectional view of a concave portion of a piston.
Figure 4:
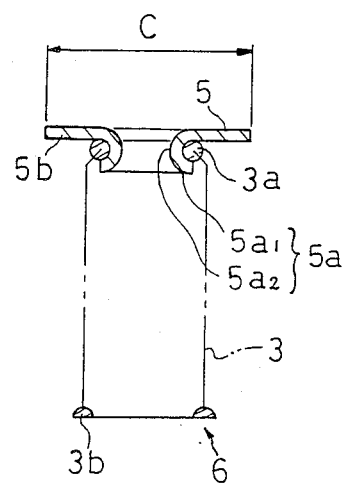
FIG. 4 is a cross sectional view of a spring assembly.

At the end of the piston 1a, as shown in FIG. 3, a concave area 2 is made, wherein the hole 2 has a steep tapered surface 2e at an opening 2d, a moderate tapered surface 2f, a small diameter section 2a, a steep tapered surface 2g, and larger diameter section 2b which is made continuously from the surface 2g. At the center of the bottom of the hole 2c a cylindrical extrusion 2h is made to extend vertical to the bottom 2c. The spring assembly 6, as shown in FIG. 4, has a coil spring 3 and a retaining member 5. One end of the coil spring 3a has a reduced diameter, and both ends 3a, 3b are made so that they become parallel. The retaining member 5 whose center is burring machined has a burring section 5a made up by brims 5a1, 5a2, and a flat surface 5b.

For example, the brim 5a1 holds the end of the coil spring 3a, while pressing the coil spring up to certain length, and the brim 5a1 is caulked by expanding its skirt to outward so that the coil spring 3 is kept vertical to the retaining member 5, whereby the spring assembly 6 is completed.

Figure 2:
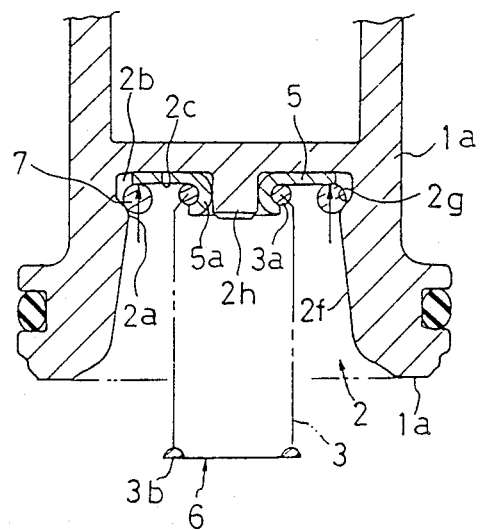
FIG. 2 is an enlarged cross sectional view of a main portion of the present invention.
Figure 5:
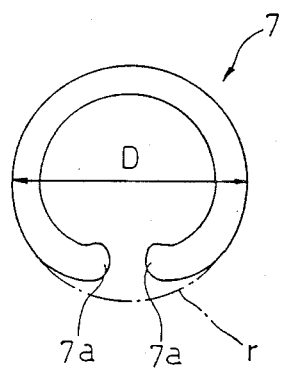
FIG. 5 is a plan view of a snap ring.

A snap ring 7, as shown in FIG. 5, is an approximate circle in plan view, its opening 7a, 7a is smaller than radius "r", and a cross section of the snap ring 7 is an approximate circle (refer to FIG. 2).

Assuming that the small diameter section 2a of the hole 2 is "B", the diameter of the retaining member 5 is "C", and a neutral diameter of the snap ring 7 is "D": the relation among them is C<B<D, and the diameter of the brim 5a2 of the retaining member 5 is equal to the extrusion 2h.

The spring assembly 6, as shown in FIG. 2, is installed in the hole 2 by fitting the brim 5a2 of the retaining member 5 in the extrusion 2h. Under this condition, the snap ring 7 is pressed along the tapered surfaces 2e, 2f, and the snap ring 7 is led to the small diameter section 2a through the moderate tapered surface 2f, and fixed in the large diameter section 2b led by the steep tapered surface 2g.

At this time as opening ends 7a, 7a of the snap ring 7 are bent toward inside, there is less chance for the snap ring 7 to damage the hole 2. And the snap ring 7 is installed in the large diameter section 2b, so that the retaining member 5 is held between the bottom of the hole 2c and the snap ring 7. At the same time, the snap ring 7 applies pressing force in the direction shown by an arrow in FIG. 2 because of the comparatively steep tapered surface 2g with the radial expansion force of the snap ring 7, so that the flat surface 5b of the retaining member 5 always and closely contacts the bottom of the hole 2c. Due to the above, in the spring assembly 6, verticalness of the coil spring 3 is correctly kept to the retaining member 5. This means that the spring assembly 6 is correctly kept vertical to the hole 2, and concentricity between the spring assembly 6 and the hole 2 is also kept correctly by fitting the burring hole 5a1 in the extrusion 2h. Furthermore, as the free end 3b of the coil spring 3 is parallel to the flat surface 5b of the retaining member 5, development of eccentric force is prevented when the coil spring 3 hits the separator plate 13.

With reference to the methods of fixing the retaining member 5 and the coil spring 3, it is not limited to the caulking under the condition that the coil spring 3 is pressed up to certain amount, but caulking by other means, bonding and welding, etc. are available by observing the condition that verticalness is kept.

The effects of the embodiment are summarized below.

The snap ring 7 is installed with radial expansion force in the large diameter section 2b through the small diameter section 2c of the hole 2, and the retaining member 5 of the spring assembly 6 is held and restrained against the bottom of the hole 2c, so the installation is quite easy and simple, furthermore once it is fixed it never comes off, and the structure of the hole is simple and the space required for installation is small. Due to the radial expansion force of the snap ring 7, the snap ring 7 presses the retaining member 5 to contact to the bottom of the hole 2c. As a result the spring assembly 6 is kept vertical correctly.

And the large diameter section is formed by a comparatively steep tapered surface 2g, and the cross section of the snap ring is formed by an approximate circular, so that contact and pressing by the snap ring 7 to the retaining member 5 are assured.

The small diameter section 2a is formed through a comparatively moderate tapered surface 2f, so the installation of the snap ring 7 is correctly assured.

The reduced diameter 3a of the coil spring 3 is held at the burring hole 5a which is located at the center of the retaining member 5 by caulking the burring hole 5a, so that the spring assembly 6 is made up simply and verticalness of the coil spring 3 to the retaining member 5 is correctly assured.

The burring hole 5a is fitted in the extrusion 2h, so that the concentricity between the spring assembly 6 and the hole 2 is assured.

The free end 3b of the coil spring 3 is made parallel to the flat surface 5b of the retaining member 5, so that development of eccentric force in the case of the coil spring 3 being hit to the separator plate 13 is prevented, the move of the piston is made smooth and the characteristics of the accumulator is correctly kept.

The spring assembly 6 is located in the accumulator chamber 9, and the coil spring 3 whose natural length is shorter than the stroke of the piston 1 is used, so that inclination of the spring assembly 6 is prevented, and the interference between the coil spring 3 and the housing 15 is prevented. Due to the above the move of the piston 1 is made smooth and the hole 2 is made small. Consequently even if air is caught in the hole 2, the accumulator characteristics are always kept correct.

We claim:

1. An accumulator comprising:
   a cylinder,
   pressing means situated in the cylinder,
   a piston slidably situated inside the cylinder, said pressing means being located at one side of the piston to urge the piston outwardly, said piston having a hole at a side opposite to the pressing means, said hole having an opening, a large diameter section at a bottom of the hole, a small diameter section adjacent the large diameter section, and a steep tapered surface extending from the small diameter section to the large diameter section so that the diameter of the hole gradually enlarges, a spring assembly situated in the hole and having a retaining member to be disposed in the large diameter section and a coil spring fixed to the retaining member at one end thereof, and a snap ring having a size larger than the size of the small diameter section of the hole so that when the snap ring is installed in the large diameter section, the snap ring engages the steep tapered surface and expands along the steep tapered surface, expansion force of the snap ring urging the retaining member to be firmly fixed to the bottom of the hole.

2. An accumulator according to claim 1, wherein said piston further includes a moderate tapered surface extending from the opening to the small diameter section.

3. An accumulator according to claim 1, wherein said snap ring has substantially a circular cross section.

4. An accumulator according to claim 1, wherein said retaining member has a burring hole at the center thereof, said burring hole being caulked to hold one end of the coil spring to keep the coil spring vertically.

5. An accumulator according to claim 4, wherein said piston further includes an extrusion at the bottom of the hole, said burring hole engaging the extrusion.

6. An accumulator according to claim 1, wherein said coil spring has a free end parallel to the retaining member.

7. An accumulator according to claim 1, further comprising an accumulator chamber, said pressing means being located in the accumulator chamber and having a natural length shorter than a stroke of the piston.

* * * * *